Figure 5:
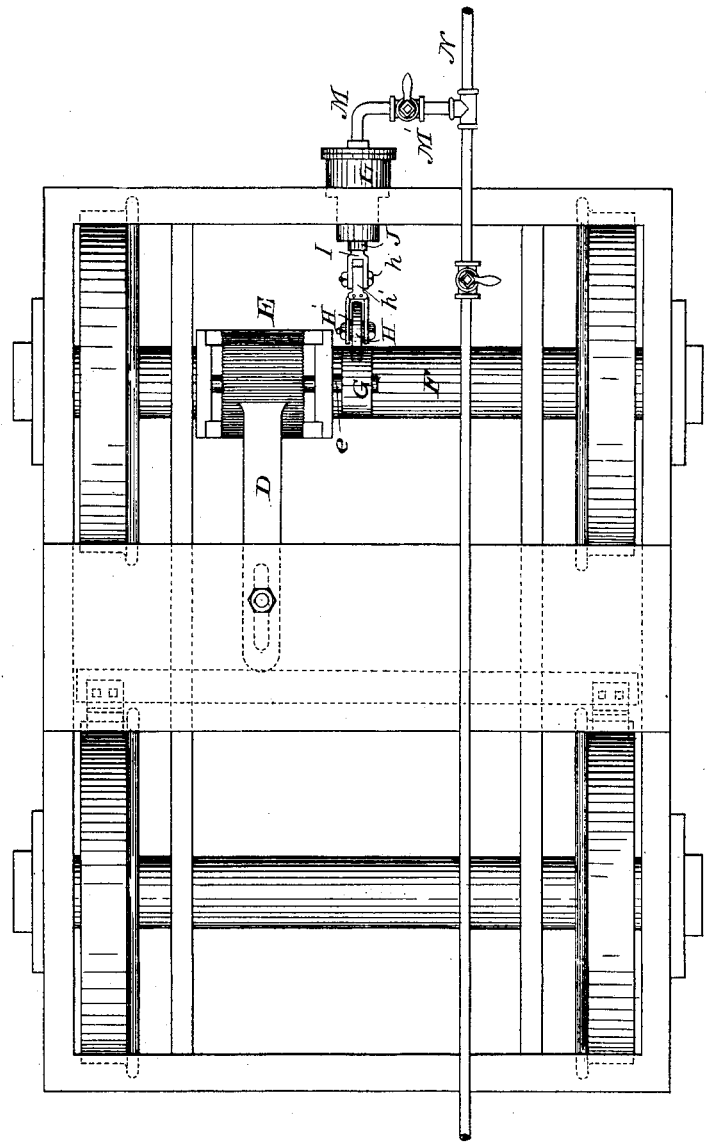

(No Model.) 2 Sheets—Sheet 1.
E. T. STARR.
MECHANISM FOR DRIVING DYNAMO ELECTRIC MACHINES BY THE MOTION OF A MOVING VEHICLE.
No. 257,404. Patented May 2, 1882.
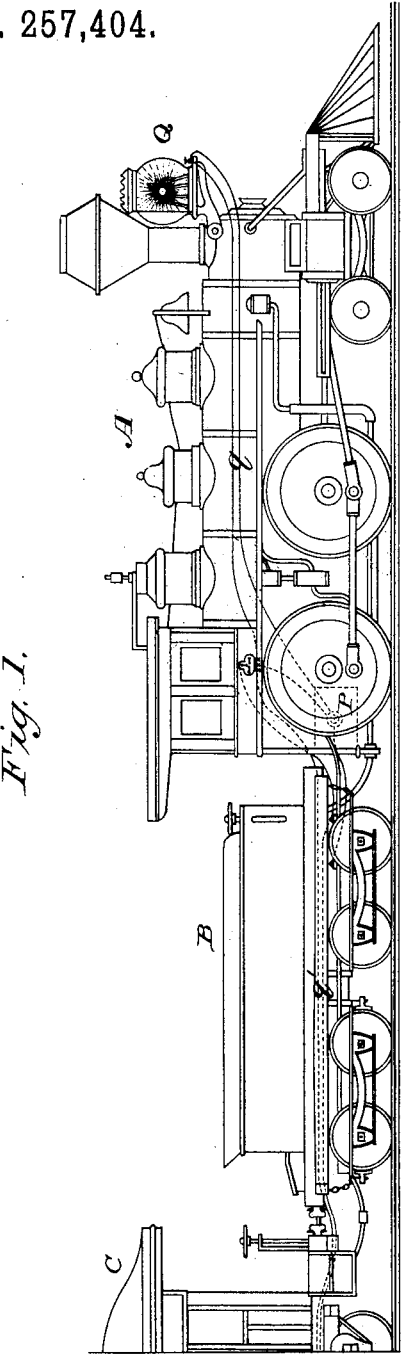
Fig. 1.
Fig. 2.
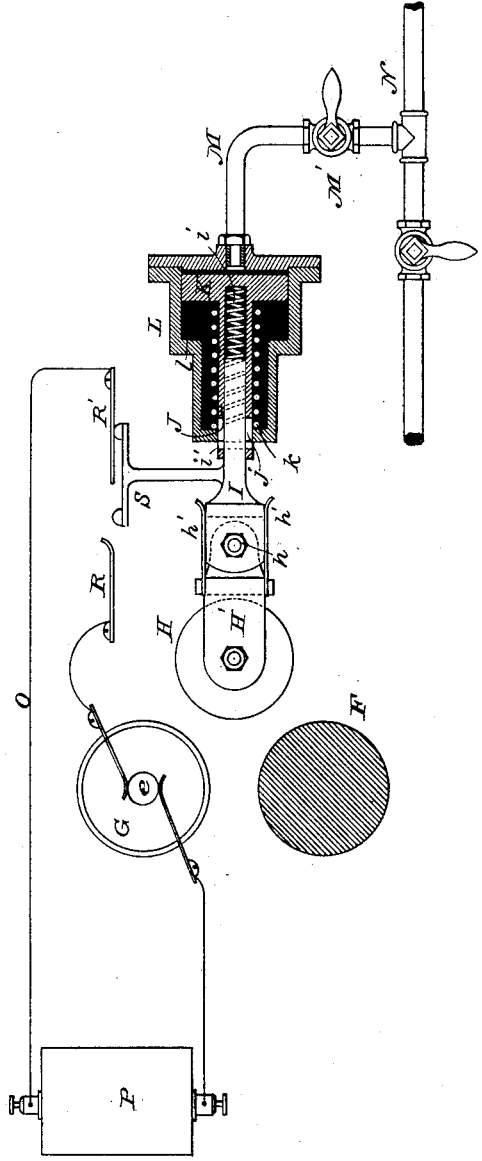
WITNESSES
Wm A Skinkle.
H. W. Elmore.
INVENTOR
Eli T. Starr,
By his Attorneys
Baldwin, Hopkins & Peyton (No Model.) 2 Sheets—Sheet 2.

E. T. STARR.
MECHANISM FOR DRIVING DYNAMO ELECTRIC MACHINES BY THE MOTION
OF A MOVING VEHICLE.

No. 257,404. Patented May 2, 1882.

WITNESSES
W<sup>m</sup> A. Skinkle.
H. W. Elmore.

INVENTOR
Eli T. Starr.
By his Attorneys
Baldwin, Hopkins & Peyton.

UNITED STATES PATENT OFFICE.

ELI T. STARR, OF PHILADELPHIA, PENNSYLVANIA.

MECHANISM FOR DRIVING DYNAMO-ELECTRIC MACHINES BY THE MOTION OF A MOVING VEHICLE.

SPECIFICATION forming part of Letters Patent No. 257,404, dated May 2, 1882.

Application filed January 31, 1882. (No model.)

*To all whom it may concern:*

Be it known that I, ELI T. STARR, of the city and county of Philadelphia, in the State of Pennsylvania, have invented certain new and useful Improvements in Mechanism for Driving a Dynamo-Electric Machine or Mechanical Generator of Electricity by the Motion of a Moving Vehicle or Vehicles, of which the following is a specification.

My invention relates to mechanism for driving a mechanical generator of electricity by the motion of a moving vehicle or train of vehicles for the purpose of charging a secondary or storage battery or batteries carried by said vehicle or train for the production of lights useful upon such vehicle or vehicles, and for other purposes.

In an application filed by me in the United States Patent Office on or about the 5th day of August, 1881, I have shown and described a practical method of an organization of mechanism or devices for producing lights useful upon railway trains, and for analogous purposes. In my said application I have shown a dynamo-electric machine connected by a driving-connection with a revolving axle of one of the vehicles, so as to be driven by the motion of the train to generate electric currents by which to charge a secondary or storage battery, whereby through suitable circuit-connections under the control of the engineer the electric current is conducted to an electric lamp at the front of the engine to produce an electric head-light for the locomotive, and to an electric light at the rear of the train to produce an electric light useful more especially as a signal-light. By means of the secondary battery the light is kept up during the stoppages of the train. An automatic circuit-breaker forms part of the circuit between the rear or signal light and the secondary battery, so that during the motion of the train said signal-light will be a flash-light, or, in other words, will be an intermittent light consisting of a continuous series of luminous electric flashes. By means of this signal-light at the rear of the train, organized to flash while the train is in motion, the engineer of an approaching train is enabled to tell whether the train bearing the signal is standing still or is in motion, and, if in motion, at what rate of speed it is moving.

The object of my present invention more especially is to so organize the dynamo-electric machine or generator and its driving connections and operating parts with the axle or rotating part of the vehicle or train that the armature of the dynamo-machine or the moving part of the generator may be driven only at particular times—such, for example, as when the train is being stopped or is running on a downgrade or decline in the road—in order to produce current to charge or polarize a secondary battery or series of batteries carried by said vehicle or train, whereby the effective working force of the locomotive or engine, while running, need not be drawn upon to drive the generator, and at the same time wear and tear of the generator are avoided save at the times necessary for its operation to produce current for the purposes required.

The subject-matter contained herein is particularly pointed out at the close of the specification.

In the accompanying drawings I have shown so much of an apparatus embodying or illustrating my present improvements as is necessary to an understanding of my invention. It will be understood, however, that some of my improvements, organizations, or combinations may be used without the others, and in ways differing somewhat from that shown.

In said drawings, Figure 1 is a view in elevation of a locomotive, its tender, and the front end of a car coupled with said tender, having my improvements applied. Fig. 2 is a view more especially of mechanism by which the generator is thrown into operation to generate electric currents, a theoretical diagram of circuit connections with a storage-battery being shown, whereby said battery is charged or put into condition for giving out electric currents. Fig. 3 is a top or plan view of the forward truck of the tender of the locomotive, showing the preferred manner of arranging the dynamo-electric machine or mechanical generator of electricity, and the mechanism for driving said generator from one of the axles of the truck when in motion.

Referring to Fig. 1, A represents a locomotive of the ordinary construction, and B its tender, consisting of a separate vehicle coupled to the locomotive, upon which the necessary supplies of fuel and water therefor are carried. A car, C, either alone or in connection with a number of other cars or like vehicles, is attached to the locomotive and tender to constitute the train.

An adjustable bracket, beam, or support, D, is connected with the front truck of the tender B, and carries or supports a dynamo-electric machine or mechanical generator of electricity, E, of any suitable construction, preferably directly over and a short distance from the forward axle, F, of said truck, as clearly shown in Figs. 2 and 3. The armature or shaft e of said dynamo-machine E has a friction driving-wheel, G, firmly fastened thereon, and a rapid revolution is imparted to said wheel, and consequently to the dynamo-machine or its armature, by means of the revolution of the axle F, a friction-wheel, H, being interposed between the wheel G of the dynamo-machine and the rotating axle, so as to form a gear-connection between said axle and said dynamo-machine. Said friction-wheel H is journaled in a suitable frame, H', and said wheel-frame H' is jointed to the rear end of a rod, I, by means of a horizontal hinge or pivot, h, so as to permit the wheel H to rock vertically in order to accommodate itself to the axle F and friction-wheel G. Suitable springs, h' h', control the rocking movement of the wheel-frame H', and keep it in the right position for the wheel to engage the axle and the wheel G to complete the gear-connection between the axle and dynamo-electric machine, as before described.

The forward or front end of the rod I is fitted in a tubular piston-rod, J, which is firmly connected at its front end with a piston-head, K, fitted to reciprocate in a cylinder, L, supported by the truck-frame. The front end of said cylinder is connected by a suitable pipe-connection, M, with a pipe, N, of the well-known air or steam brake in common use upon railway-trains, whereby when the compressed air or steam is being forced through said pipe N to operate the brakes which are to stop the motion of the train, a column of compressed air or steam is also forced through the pipe-connection M and acts against the piston K, driving it backward in the cylinder until the piston abuts against the annular internal shoulder, l, of said cylinder. This operation of the piston K thrusts the friction-wheel H in contact with the axle F of the truck and the driving-wheel G of the dynamo-machine, and said machine will then be driven as long as the axle revolves and the brake-pressure is kept up, or, in other words, until the brakes are off. As soon as the pressure upon the piston ceases said piston is thrust forward by means of a spring, k, coiled about the piston-rod J, and compressed between the rear face of the piston and the rear wall of the piston-cylinder, as clearly shown in Fig. 2. This forward or return movement of the piston carries the friction-wheel H out of gear with the axle F and wheel G, and the dynamo-machine is consequently disconnected from the driving-power and remains at rest until the brakes are again applied. I have deemed it unnecessary to show or describe the brake mechanism in detail, as the particular form of such mechanism constitutes no part of my invention. I have shown so much of the air or steam pipes and of the mechanism operated by them as is necessary to an understanding of my invention.

In order to regulate the amount of pressure by the friction-wheel H upon the axle F and wheel G, when in gear, whatever may be the pressure upon the piston, said piston, as before stated, is limited in its backward movement by the shoulder l, while in the bore of the tubular piston-rod J, I insert a spring, i, compressed between the forward end of the rod I and the rear face or wall of the piston. Said spring i thrusts the rod I backward while enabling it to move forward relatively to the piston-rod J when the wheel H is forced against the axle F and wheel G. By this means an effective pressure is obtained to drive the dynamo-machine from the axle, while the danger of pressure to such an extent as to act as a brake and prevent the revolution of the driving-wheel G of the dynamo-machine which might otherwise occur is avoided. The endwise movement of the rod I is limited by the through-pin i', which works in a longitudinal slot j in said rod J. This pin also prevents the rod I from turning axially in the rod J, while the piston-rod J may be prevented from turning in the cylinder L by any suitable means, if desired.

A suitable stop-cock or valve arrangement, M', in the pipe-connection M is preferably employed in order to cut out the dynamo-machine when desired, so that the operation of the brakes will have no effect upon said machine.

I have thus described one way of mechanically connecting a dynamo-machine or mechanical generator of electricity with the axle or moving part of a vehicle which is to drive it, and of mechanically disconnecting it from said axle or moving part, whereby I am enabled to connect the dynamo-machine at will, and at the time it is desired to stop or check the momentum of the car or train—as, for instance, in approaching a station, or running on a downgrade or decline in the road. The dynamo-machine will thus act as a brake to aid in checking the momentum of the train, and the retarding force, instead of being converted into heat and wasted, as in the application of the ordinary friction-brakes, will be converted into electricity to be used, in this example, for the charging of a secondary battery and the production of electric lights upon the train.

I do not limit myself to the peculiar mechanism described for connecting the dynamo-machine with and disconnecting it from the driving-power at will, as other means may be employed to accomplish this result.

The electricity generated by the dynamo-machine or mechanical generator E is conducted by circuit-connections O to a secondary or storage battery, P, (which may be of any approved construction,) to charge said battery. From said storage-battery a portion of electric current is conducted to an electric lamp, Q, at the front of the locomotive by circuit-connections $q$, Fig. 1, in order to produce the head-light, while circuit-connections $q'$ also lead from said storage-battery to electric lamps in the train and to electric signal-lamps at the rear of the train, in order to supply current to them.

It is deemed unnecessary to show the train-lamps, other than the head-light, in the drawings.

The storage-battery (or series of batteries) P may be mounted upon the locomotive under the engineer's cab, as shown in Fig. 1, which is the position preferred, and the circuit-connections of the train-lamps may be run from car to car by suitable couplings in ways well understood by skillful electricians.

In order that the circuit from the generator to the storage-battery may be completed when the generator is in motion, and broken when said generator is not in motion, or is not being driven, so as to prevent the battery-current returning to the generator to injure it or to produce inconveniences well understood by skillful electricians, I introduce into or make part of the circuit O two springs, R R', mounted upon the truck, the ends of which are separated, as clearly shown in Fig. 2.

Rising or extending upward from the reciprocating rod I is an insulated T-shaped conducting contact-piece, S, in this instance, which, when the rod I is thrust backward to make the gear-connection between the axle F and wheel G, makes contact with the said springs R R', so as to close the circuit between the generator and storage-battery, while, when said rod I is retracted or thrown forward so as to permit the generator to come to rest and cease to give out current, the said contact-piece S will not bridge the space between the two springs R R', as clearly shown in full lines in Fig. 2, whereby the circuit will be broken, which prevents all danger of current from the battery flowing or returning to the generator. It will thus be seen that the circuit, including the generator and battery, is automatically completed when the generator is being driven, and automatically broken when the driving mechanism is thrown out of gear.

It will be understood that I do not limit myself to the peculiar devices shown for completing the circuit O when the machine is thrown into action, and for breaking said circuit when the machine is not driven.

Suitable switches, as shown in Fig. 1, and as fully described in my aforesaid application, will be arranged within convenient reach of the engineer, whereby he may control the flow of current to the head-light and to the train-lights, and whereby, also, he may make and break the circuit from the generator to the battery at pleasure, so that even when the brakes are applied or the dynamo-machine is in motion no current can pass to the storage-battery.

I claim as my invention—

1. The combination, substantially as hereinbefore set forth, of a vehicle or train of vehicles, a brake mechanism to brake or impede the motion of said vehicle or train, a mechanical generator of electricity carried by said vehicle or train, driving mechanism to connect said generator with an axle or moving part of the vehicle or train, and a connection between said brake and said driving mechanism, whereby when the brake mechanism is operated to retard the motion of the vehicle or train the generator will be operated.

2. The combination, substantially as hereinbefore set forth, of a vehicle or train of vehicles, a brake mechanism therefor, a mechanical generator of electricity and devices to throw said generator into action by the operation of the brake mechanism, so as to be driven by a moving part of the vehicle or train, and mechanism to cut out the generator so that the brakes may be applied without throwing said generator into action.

3. The combination, substantially as hereinbefore set forth, of a vehicle or train of vehicles, a brake mechanism therefor, a mechanical generator of electricity, driving mechanism between said generator and axle or moving part of said vehicle or train, adapted to be thrown into action by said brake mechanism, and mechanism, substantially as described, to regulate the action of said brake mechanism relatively to the driving mechanism, so as to insure a proper driving-connection between said generator and said axle.

4. The combination, substantially as hereinbefore set forth, of the vehicle and axle or moving part of said vehicle, the mechanical generator of electricity, the driving-wheel of said generator, the gear-wheel to establish a driving-connection between said generator and said axle, a movable arm carrying said gear-wheel to establish or interrupt the driving-connection, and a piston to move said movable arm.

5. The combination, substantially as hereinbefore set forth, of a vehicle, an axle of said vehicle, a mechanical generator of electricity, a gear-wheel to establish the driving-connection between said generator and said axle, a piston governing the movements of said gear-wheel, a cylinder in which said piston moves, a pipe-connection by which pressure is brought to bear upon said piston to move it and the gear-wheel in the direction to establish the driving-connection, and a spring to move said piston and wheel in the direction to interrupt or sever the driving-connection.

6. The combination, substantially as hereinbefore set forth, of an axle or moving part of a vehicle, a mechanical generator of electricity, a driving-connection between said axle and said generator, means for operating said driving-connection at will, so as to throw said generator into or out of action, a secondary battery connected with said generator by circuit-connections, and mechanism, substantially as described, connected with said driving-connection, to complete the circuit to the battery when said connection with the generator is completed and break said circuit when the driving-connection is broken.

In testimony whereof I have hereunto subscribed my name.

ELI T. STARR.

Witnesses:
E. EUGENE STARR,
SAMUEL E. STARR.